United States Patent [19]

Kadan et al.

[11] 4,201,709

[45] May 6, 1980

[54] PROCESS FOR PRODUCING A LOW GOSSYPOL PROTEIN PRODUCT FROM GLANDED COTTONSEED

[75] Inventors: Ranjit S. Kadan; Donald W. Freeman; James J. Spadaro, all of New Orleans; George M. Ziegler, Jr., Harahan, all of La.

[73] Assignee: The United States of America as represented by the Secretary of Agriculture, Washington, D.C.

[21] Appl. No.: 910,153

[22] Filed: May 26, 1978

[51] Int. Cl.² ............................................. A23J 1/14
[52] U.S. Cl. .............................. 260/123.5; 426/430; 426/656
[58] Field of Search ...................................... 260/123.5

[56] References Cited

U.S. PATENT DOCUMENTS

| | | | |
|---|---|---|---|
| 3,124,461 | 3/1964 | Meinke et al. | 426/430 |
| 3,615,657 | 10/1971 | Gastrock et al. | 260/123.5 X |
| 3,895,003 | 7/1975 | Swain et al. | 260/123.5 |
| 3,965,086 | 6/1976 | Swain et al. | 260/123.5 |
| 3,972,861 | 8/1976 | Gardner et al. | 260/123.5 |

OTHER PUBLICATIONS

Fed. Register, vol. 39 (No. 177), 32735–1974 (Sep. 11).

*Primary Examiner*—Howard E. Schain
*Attorney, Agent, or Firm*—M. Howard Silverstein; David G. McConnell; Salvador J. Cangemi

[57] ABSTRACT

A low-gossypol, high-protein flour is produced by a process which utilizes conventional solvent extraction equipment with a certain series of steps, culminating at a point where a defatted, milled, cottonseed flour mixture is rendered edible for human consumption by the separation of the gossypol-containing portion.

5 Claims, 2 Drawing Figures

FIGURE I

PROCESS FOR PRODUCING A LOW GOSSYPOL PROTEIN PRODUCT FROM GLANDED COTTONSEED

BACKGROUND OF THE INVENTION (1) Field of the Invention

This invention relates to the production of protein products from cottonseed. Specifically, this invention relates to a process for producing a flour product having reduced free gossypol from glanded cottonseed.

(2) Description of the Prior Art

The literature discloses that worldwide about 3.5 million tons of cottonseed proteins are potentially available from glanded cottonseed. However, cottonseed proteins are rarely utilized as a source of edible food because of the presence of pigment glands which contain toxic gossypol. This has been the major obstacle in the exploitation of this valuable source of high quality nutritious proteins. The Federal Register, Vol. 39, No. 177, page 32,735, Sept. 11, 1974, indicates that the Food and Drug Administration (HEW) specifically requires that a protein food product made from cottonseed have a content of less than 0.045% free gossypol to be considered edible.

In the literature there are a few authors and inventors who imply that they can produce edible protein products. U.S. Pat. Nos. 3,615,657, and 3,972,861 teach the production of edible cottonseed protein concentrates by what is now known as the liquid cyclone process (LCP). LCP disintegrates cottonseed kernels and separates pigment gland there from in a non-polar solvent, such as hexane.

There are several unattractive features to these processes, among which is performing the separation in a liquid medium, the filtration extraction step is relatively slow, and the separation of the product from the solvent-wet slurry is not satisfactory. Furthermore, these processes require specialized processing equipment.

U.S. Pat. No. 3,124,461 discloses moisture adjustments made on whole or split kernels with optimum moistures of about 5% to 8% prior to processing. Unfortunately, drying kernels requires more energy than drying flakes. Defatted material is milled by a non-conventional method and then subjected to gaseous classification for separation of pigment glands.

Although this patent discloses low pigment gland breakage during comminution, it can be seen in the Example 5 that considerable gland breakage has occurred since no air-classified products were produced below 0.060% free gossypol. Apparently the (1) method of extraction, (2) method of milling, and (3) method of gaseous classification, as well as other efforts of the prior art, still do not yield the desired edible protein product. This process of the prior art employs reextraction with a polar solvent to lower free gossypol content in the final product. The use of polar solvent, as those skilled in the art well know, introduces other technical problems. This disclosure indicates that a product suitable for human consumption—that is, with a free gossypol content of below 0.06%—was obtained only by reextracting the air-classified material, using 80% isopropanol, a polar solvent.

U.S. Pat. Nos. 3,895,003 and 3,965,086 deal with the preparation of protein concentrates from oilseed flours by employing air classification. These two disclosures are not concerned with the removal of pigment glands and the subsequent production of low gossypol cottonseed flours. In both instances only glandless or deglanded flours were employed.

BRIEF DESCRIPTION OF THE DRAWINGS

FIG. 1 is a flow diagram delineating the steps which are generally taken in the known prior art, while FIG. 2 is a flow diagram dilineating the steps achieved through the process of the present invention.

SUMMARY OF THE INVENTION

The main object of this invention is to provide an improved process of producing from glanded cottonseeds a high-protein flour essentially free of free-gossypol so that the product is suitable for human consumption. The object of the invention is accomplished by an improvement in the general process comprised of the following steps:

(a) flaking dehulled glanded cottonseeds having moisture contents of from 5 to 12%;

(b) solvent extracting the cottonseed flakes to reduce fat content;

(c) desolventizing the solvent extracted flakes;

(d) milling the desolventized flakes into a flour; and (e) air classifying the flour to produce a coarse fraction and a first fines fraction.

The improvement comprises reducing the moisture content of the cottonseed flakes to 1% to 4% by weight prior to solvent extraction to produce a cottonseed flour product suitable for human consumption having a free gossypol content of 0.045% or less.

The product of the above improved process can be further processed to a cottonseed flour having even lower free-gossypol content.

DESCRIPTION OF THE PREFERRED EMBODIMENTS

Figure 1:
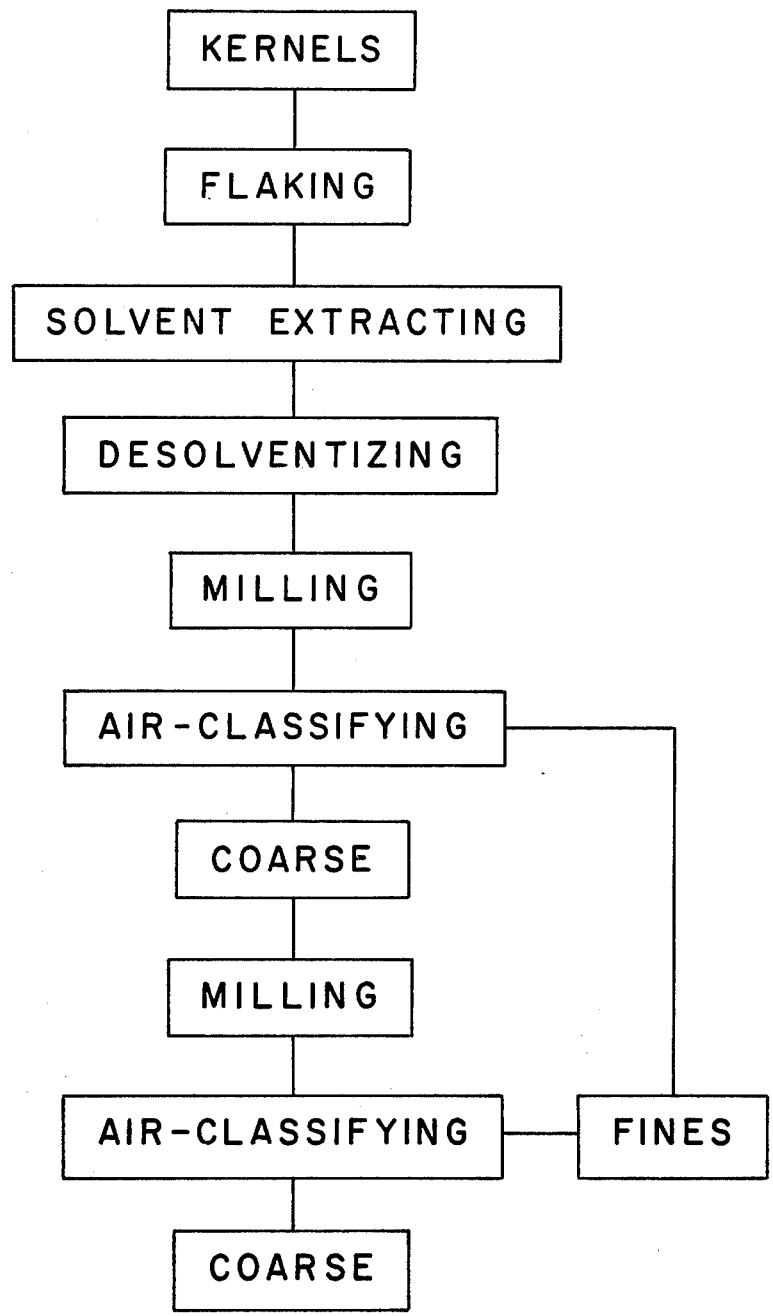
FIGS. 1 and 2 are provided for comparative purposes.
Figure 2:
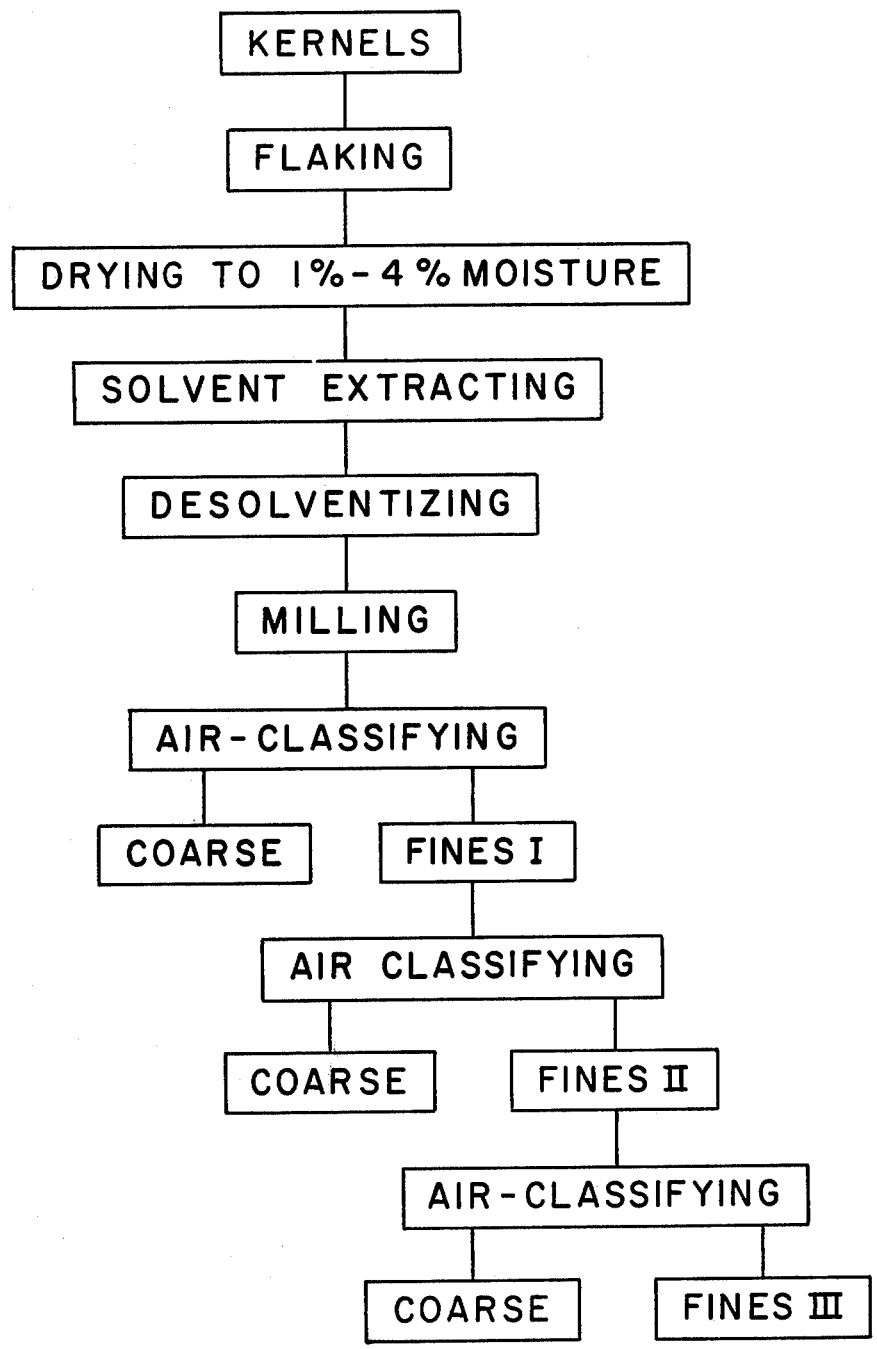

Referring to FIG. 2, dehulled cottonseed kernels essentially devoid of hulls are flaked at a moisture content of about from 5% to 12% in equipment preferably adjusted to yield flakes of about 0.01 to 0.03 of an inch in thickness. The drying is done immediately after flaking preferably by applying an air stream of about from 70° to 105° C. temperature, in a high velocity "through-flow" type dryer to obtain a flake material with a moisture content of about 1% to 4% by weight, preferrable 2% or less.

By drying the flakes to less than 4% moisture, this invention provides for production of an air-classified product containing 0.045% free gossypol or less, thus meaning that essentially no pigment gland damage is done. It is not completely understood, but it appears that as a result of this drying step the pigment glands are able to withstand more rigorous milling, such as impact milling, without rupture.

Lipids are extracted from the flakes by adding a quantity of non-polar solvent at temperatures of about from 20° to 40° C. in the extractor to obtain flakes with a lipid content of about from 1% to 3%. Flakes containing more than 3% lipids would result in air-classification yields below what is thought to be practical and would also result in product lipid contents above an undesirable level of 2.0%. Below 1% lipids the pigment glands tend to rupture more easily during milling. Desolventizing is carried out immediately and continuously in equipment designed to recover solvents by the use of heat.

The desolventized flakes are then milled in an impact-type mill, such as a pin or hammer mill, designed to produce about 60% of the material with particle size of 25 microns or less. Significant pigment gland rupture does not occur. This fact was unexpected because it is generally believed that impact milling would do excessive pigment gland damage. However, mills such as oilseed crushing rolls and particle against particle disintegrators, were found to result in excessive pigment gland damage thus causing free gossypol contents above 0.060% while the use of impact mills in the method of the invention results in products containing 0.045% or less free-gossypol.

Separation of pigment glands from the milled flour preferably is achieved by a centrifugal air-classifier employing centrifugal and gaseous classification simultaneously (separating principle is the action of two opposing forces, that is, the centrifugal force and the centripetal frictional drag of the air, on each particle). Suitable apparatus for this purpose are represented by any of the commercially available centrifugal air classifiers. Edible—that is, less than 0.045% free gossypol—protein flour products which are obtained are about from 35% to 42% by weight of the starting defatted material. Milled flours are air classified in such a manner so as to produce a fines fraction I that represents about 50 to 60% of the weight of the starting defatted, unclassified flour. This fines fraction is further air classified into fines fraction II and III which in turn may or may not be further air classified, depending on the desired product gossypol content. This process of always reclassifying the fines fractions is a departure from the prior art wherein it is a common practice to reclassify the coarse fraction(s).

Depending on seed type and processing conditions prior to air classifications, fines I and II may be low enough in free-gossypol content to be acceptable products.

When a lower than edible gossypol content is desired in the final product this can be achieved without the loss of nutritive value, by the application of heat during or after the separation step. It should be noted that the free gossypol content of fines fraction I and II (FIG. 2) can be lowered to meet the edible (<0.045% free gossypol) standard by the application of heat, thus eliminating one or two classification steps and resulting in significantly higher yields. Heating fines fraction III results in further reduction of its already low gossypol content. A high protein, very low free-gossypol content flour product can be obtained with temperatures of 100° to 150° C., and potentially as high as 200° C.

The following examples are provided to illustrate some of the preferred embodiments and should not be construed as limiting the invention in any manner whatever.

Available Lysine was determined by the method disclosed in the "Determination of Available Lysine in Oilseed Meal Proteins" paper by S. R. Rao, et al presented in Analytical Chemistry, Vol. 35, No. 12, pp 1927-30. All other analyses were determined by methods of the American Oil Chemists Society, Official and Tentative Methods, 3rd Edition (Rev. 1975).

With reference to Examples 1 through 4, kernel moisture content was 8% prior to flaking. Hull content of the kernels was 1% prior to flaking.

EXAMPLE 1

Effect of Flake Moisture Prior to Solvent Extraction on Air-Classification Products:

Fifteen pounds of Mississippi cottonseed kernels were flaked to a thickness of 0.015 of an inch and divided into two lots; one lot was dried to a moisture content of 2%, and the other to a moisture content of 5%. Drying of both lots was carried out at 82° C. in a "through-flow" type dryer. The dried flakes were than extracted to remove lipids. To do this, flakes were extracted with 5 passes of fresh hexane in a basket extractor using a total solvent-to-meal ratio of 2:1, employing hexane at 22° C. Extraction time was approximately 20 minutes per pass. The extracted flakes were desolventized at 82° C. for a period of 2 hours, under 15 inches of vacuum. Desolventized flakes were milled in a fixed hammer disintegrator equipped with a 0.016 inch diameter opening sizing screen. The milled flour was air classified 3 times in a centrifugal air classifier (Donaldson Acucut A-12), always reclassifying the fines fraction with an air flow of 70 standard cu. ft. per min. (SCFM). Fines fraction I was obtained using a rotor speed of 750 rpm, the fines fraction II was obtained using a rotor speed of 850 rpm, and fines fraction III was the final product and was obtained using a rotor speed of 950 rpm. Measurements were recorded on Table I below.

TABLE I

| Cottonseed Flakes Moisture Content % | Air-Classified Cottonseed Flour | | | | | |
|---|---|---|---|---|---|---|
| | | | Gossypol | | | |
| | Yield % | Protein* % | Free % | Total % | H$_2$O % | Lipids % |
| 2 | 36 | 62.1 | 0.040 | 0.087 | 7.94 | 2.00 |
| 5 | 36 | 63.8 | 0.082 | 0.138 | 8.06 | 1.36 |

*The protein % is obtained by multiplying nitrogen % × 6.25

As can be seen, it is advantageous to dry flakes to 2% moisture prior to solvent extraction in order to obtain an edible air-classified cottonseed product, containing less than 0.045% free-gossypol.

EXAMPLE 2

Effect of Flake Drying Method Prior to Solvent Extraction on Air-Classified Products:

Thirty pounds of Mississippi cottonseed kernels were flaked to a thickness of 0.015 of an inch and were divided into 3 lots. Each lot was dried to 2% moisture at 82° C., by one of three drying methods. The dried flakes were then solvent extracted to 1.8% lipids, desolventized, milled and air classified as in Example 1. Measurements were recorded on Table II, below.

TABLE II

| Cottonseed Flakes Drying Method | Air-Classified Cottonseed Flour | | | | | |
|---|---|---|---|---|---|---|
| | | | Gossypol | | | |
| | Yield % | Protein* % | Free % | Total % | H$_2$O % | Lipids % |
| Through-flow | 36 | 64.4 | 0.045 | 0.080 | 7.14 | 1.26 |
| Vacuum | 35 | 65.6 | 0.064 | 0.124 | 7.54 | 1.02 |
| Across-flow | 32 | 65.8 | 0.065 | 0.114 | 7.40 | 1.15 |

*The protein % is obtained by multiplying nitrogen % · 6.25

The date in Table II indicates that a through-flow dryer is preferred in drying the flakes prior to solvent extraction. Lower free-gossypol-containing, air-classified products are obtained using this type of dryer.

EXAMPLE 3

Effect of Residual Lipid on Air-Classified Products:

Thirty pounds of Mississippi cottonseed kernels were flaked and dried to 2% moisture as in Example 1. The dried flakes were then divided into 6 lots. Each lot was extracted with hexane at 22° C. in extraction baskets to 5 different lipid levels ranging from 0.50% to 2.50%. After solvent extraction flakes were desolventized, milled and air-classified as in Example 1, these were the results obtained.

TABLE III

| Flake Lipid Content % | Air-Classified Cottonseed Flour | | | | | |
|---|---|---|---|---|---|---|
| | Yield % | Protein* % | Gossypol Free % | Gossypol Total % | H$_2$O % | Lipids % |
| 2.50 | 31 | 60.9 | 0.040 | 0.080 | 7.74 | 1.50 |
| 1.90 | 35 | 63.0 | 0.045 | 0.083 | 7.36 | 1.03 |
| 1.58 | 35 | 64.1 | 0.051 | 0.089 | 7.40 | 0.81 |
| 1.40 | 40 | 65.0 | 0.070 | 0.112 | 6.66 | 0.75 |
| 1.00 | 38 | 65.9 | 0.080 | 0.150 | 8.00 | 0.68 |
| 0.50 | 41 | 67.1 | 0.081 | 0.155 | 7.80 | 0.41 |

*The protein % is obtained by multiplying nitrogen % × 6.25

Table III indicates that as flake lipid level is increased free gossypol content of the air-classified product is decreased. However, it should be noted that air-classified product yields are decreased as lipids are increased. As can be seen under "Flake Lipid Content", lipid level of approximately 2% appears to be a desirable value.

EXAMPLE 4

Effect of Heat to Lower the Free-Gossypol Content in Air-Classified Products:

Five pounds of Mississippi cottonseed kernels were flaked, dried to 2% moisture, solvent extracted to 1.60% lipids content, desolventized, milled and air-classified, as in Example 1. The resulting fines III fraction, representing 35% of the starting milled flour was placed in a cloth bag with openings in the weave large enough to allow easy air mobility through the sample. The bag containing the fines III fraction was heated in a high velocity through-flow dryer at 150° C. Samples were withdrawn at 5 minute intervals to generate the following data (Table IVa).

TABLE IVa

HIGH-TEMPERATURE, SHORT-TIME HEAT EXPOSURE

| Heating Time (Min.) | Air-Classified Cottonseed Flour | | | | |
|---|---|---|---|---|---|
| | Available Lysine** | Protein* % | Gossypol Free % | Gossypol Total % | H$_2$O % |
| 0 | 3.96 | 64.1 | 0.042 | 0.054 | 6.68 |
| 5 | 3.90 | 65.4 | 0.038 | 0.058 | 3.60 |
| 10 | 3.91 | 65.4 | 0.036 | 0.058 | 2.88 |
| 15 | 3.89 | 66.1 | 0.033 | 0.056 | 1.66 |
| 20 | 3.92 | 65.3 | 0.028 | 0.061 | 1.50 |

*The protein % is obtained by multiplying nitrogen % × 6.25
**The quantity of lysine is obtained as grams/16 grams of N The data of Table IVa shows that heat applied in a high velocity through-flow type dryer can reduce free-gossypol in air-classified products by short heat exposure times without damaging protein quality as indicated by available lysine.

In other investigations, five pounds of Mississippi cottonseed kernels were flaked, dried to 2% moisture, solvent extracted to 1.70% residual lipids content, desolventized, and milled as in Example 1. The milled flour was then air-classified once, at 70 SCFM and a rotor setting of 650 rmp to yield a product representing 48% yield of the starting flour by weight. This air-classified fraction was heated in an open pan at 121° C. in a laboratory oven for various lengths of time. The results thus obtained are tabulated below (Table IVb).

TABLE IVb

LOW TEMPERATURE, LONG-TIME HEAT EXPOSURE

| Heating Time (Hrs.) | Air-Classified Cottonseed Flour | | | | |
|---|---|---|---|---|---|
| | Available Lysine** | Protein* % | Gossypol Free % | Gossypol Total % | H$_2$O % |
| 0 | 3.96 | 61.7 | 0.118 | 0.170 | 7.56 |
| 1 | 3.93 | 64.8 | 0.079 | 0.168 | 2.84 |
| 2 | 3.95 | 65.3 | 0.061 | 0.163 | 1.96 |
| 3 | 3.91 | 65.6 | 0.058 | 0.160 | 1.80 |
| 4 | 3.89 | 65.6 | 0.045 | 0.163 | 1.64 |

*The protein % is obtained by multiplying nitrogen % × 6.25
**The quantity of lysine is obtained as grams/16 grams of N The tabulated data of Table IVb shows that moderate heat can be used to reduce free-gossypol in air-classified products while not damaging the protein quality, as indicated by available lysine. A more efficient means of heat-treating could probably be used whereby free-gossypol reductions could be accomplished in shorter heating times. Here a much higher free-gossypol-containing protein can be converted to edible protein by the application of heat.

EXAMPLE 5

Effect of Hull Material on Air-Classified Products:

Ten pounds of Mississippi cottonseed kernels having a moisture content of 8% were handpicked free of loose hull pieces. The word "handpicked" implies here that all visible hull material has been removed from the kernels. The kernels were flaked to a thickness of 0.015 of an inch and were then dried to 2% moisture in a throughflow type dryer at 82° C. The dried flakes were solvent extracted to 1.8% lipids content and desolventized, as in Example 1. After desolventization the flakes were divided into 3 lots, prior to milling with a fixed hammer disintegrator equipped with a 0.016 of an inch opening sizing screen. One lot was milled "as is". The other two lots were milled after the addition of known amounts of hulls to obtain one lot with 2% hulls content, and the other with 4% hulls content. The milled flours were air classified as in Example 1.

The pertinent data is presented in Table V, below.

TABLE V

| Cottonseed Hulls Content % | Air-Classified Cottonseed Flour | | | | | |
|---|---|---|---|---|---|---|
| | Yield % | Protein* % | Gossypol Free % | Gossypol Total % | H$_2$O % | Lipids % |
| 0 | 35 | 64.3 | 0.040 | 0.083 | 7.40 | 1.20 |
| 2 | 35 | 63.8 | 0.091 | 0.091 | 8.00 | 1.26 |
| 4 | 36 | 63.6 | 0.150 | 0.215 | 7.48 | 1.38 |

*The protein % is obtained by multiplying nitrogen % × 6.25.

From studying the data in Table V it can be learned that to achieve the lowest free gossypol-containing product the hulled kernels should be as devoid of hull material as possible prior to milling.

We claim:

1. In a process for producing protein flour having reduced free gossypol content from glanded cottonseed wherein the process comprises the following steps:

(a) flaking dehulled, glanded cottonseed with a moisture content of about from 5% to 12% by weight,
(b) solvent extracting the cottonseed flakes to reduce fat content,
(c) desolventizing the solvent extracted flakes, and
(d) milling the desolventized flakes into a flour, the improvement wherein the moisture content of the cottonseed flakes is reduced to about from 1% to 2% by weight prior to solvent extraction, the fat content of the cottonseed flakes is reduced to about from 1% to 3% by weight, and air-classifying the flour to obtain a coarse fraction and a fines fraction, thereafter repeatedly air-classifying the fines fractions until a food grade flour with a free gossypol content of less than 0.045% is achieved.

2. The process of claim 1 wherein a hull content of the initial cottonseed of the process is less than 2%.

3. The process of claim 1 wherein the moisture content of the cottonseed flakes is reduced by means of a high-velocity flow-through dryer.

4. The process of claim 1 wherein the number of air-classification steps is determined by the percentage of free gossypol desired.

5. The process of claim 1 wherein the air-classification is accomplished by means of a centrifugal air-classifier.

* * * * *